US007684385B2

(12) United States Patent
Hallmark et al.

(10) Patent No.: US 7,684,385 B2
(45) Date of Patent: Mar. 23, 2010

(54) INTER-ENTERPRISE TELEPHONY USING A CENTRAL BROKERAGE DEVICE

(75) Inventors: Addis Eli Hallmark, McKinney, TX (US); Marc Coiner Ayres, Allen, TX (US)

(73) Assignee: Cisco Technology, Inc., San Jose, CA (US)

( * ) Notice: Subject to any disclaimer, the term of this patent is extended or adjusted under 35 U.S.C. 154(b) by 1537 days.

(21) Appl. No.: 10/982,206

(22) Filed: Nov. 3, 2004

(65) Prior Publication Data
US 2006/0092919 A1 May 4, 2006

(51) Int. Cl.
*H04L 12/66* (2006.01)
(52) U.S. Cl. .................. 370/352; 370/401; 379/221.02
(58) Field of Classification Search ................. 709/223; 370/352, 401; 379/196, 197, 198
See application file for complete search history.

(56) References Cited

U.S. PATENT DOCUMENTS

| | | | |
|---|---|---|---|
| 6,157,636 A | 12/2000 | Voit et al. .................. 370/353 |
| 6,157,648 A | 12/2000 | Voit et al. .................. 370/401 |
| 6,292,481 B1 | 9/2001 | Voit et al. .................. 370/352 |
| 6,606,708 B1 * | 8/2003 | Devine et al. .................. 726/8 |
| 6,799,210 B1 | 9/2004 | Gentry et al. ............... 709/223 |
| 2002/0154635 A1 * | 10/2002 | Liu ............................. 370/392 |
| 2003/0093563 A1 * | 5/2003 | Young et al. ................ 709/245 |

* cited by examiner

*Primary Examiner*—Fan Tsang
*Assistant Examiner*—Simon King
(74) *Attorney, Agent, or Firm*—Baker Botts L.L.P.

(57) ABSTRACT

A system for inter-enterprise telephony communications includes a central brokerage device that can receive a packet encoding a dialed telephone identifier generated by a first telephony device located in the first enterprise network, where the dialed telephone identifier is associated with a second telephony device located in a second enterprise network. The central brokerage device can also identify a network address of the second enterprise network using connectivity information if the dialed telephone identifier matches resolution information. The system also includes the first enterprise network, which can establish an encrypted communication link with the second enterprise network through a packet-based network using the identified network address if the dialed telephone identifier matches the resolution information. The first enterprise network can also establish a second communication link between the first enterprise network and the second enterprise network through a circuit-switched network using the dialed telephone identifier if the dialed telephone identifier does not match the resolution information.

36 Claims, 2 Drawing Sheets

INTER-ENTERPRISE TELEPHONY USING A CENTRAL BROKERAGE DEVICE

TECHNICAL FIELD OF THE INVENTION

The present invention relates generally to inter-enterprise telephony, and, more particularly, to inter-enterprise telephony using a central brokerage device.

BACKGROUND OF THE INVENTION

Enterprises are increasingly adopting packet-based telephony solutions for personal and business telephone networks. These solutions work well for calls within enterprises, but significant difficulties arise when attempting packet-based, enterprise-to-enterprise calls.

SUMMARY OF THE INVENTION

In accordance with the present invention, techniques for inter-enterprise telephony using a central brokerage device are provided. According to particular embodiments, these techniques support communications between enterprise networks utilizing packet-based protocols. In particular, a brokerage device may be able to identify enterprise networks using telephone numbers. Furthermore, the brokerage device may be able to provide connectivity data associated with particular enterprise networks to gateways for establishing secure, packet-based communications sessions. The brokerage device may also provide for fallback connections between enterprise networks using a circuit-switched network. In addition, the brokerage device may support packet-based, rich media streams and conferencing services.

According to a particular embodiment, a system for inter-enterprise telephony communications includes a central brokerage device that can receive a packet encoding a dialed telephone identifier generated by a first telephony device located in the first enterprise network, where the dialed telephone identifier is associated with a second telephony device located in a second enterprise network. The central brokerage device can also identify a network address of the second enterprise network using connectivity information if the dialed telephone identifier matches resolution information. The system also includes the first enterprise network, which can establish an encrypted communication link with the second enterprise network through a packet-based network using the identified network address if the dialed telephone identifier matches the resolution information. The first enterprise network can also establish a second communication link between the first enterprise network and the second enterprise network through a circuit-switched network using the dialed telephone identifier if the dialed telephone identifier does not match the resolution information.

Embodiments of the invention provide various technical advantages. These techniques may allow enterprises to communicate with one another using packet-based intermediary networks. According to particular embodiments, a central brokerage device may provide a central repository for connectivity data used to establish communications sessions between enterprise networks. Utilizing the brokerage device may therefore reduce the amount of connectivity data required to be stored by individual enterprise networks. According to particular embodiments, these techniques provide a scalable solution for multiple enterprise networks. These techniques may also provide for secure communications over an end-to-end, packet-based communication link. Furthermore, by utilizing a central brokerage device, trust boundaries between enterprise networks may be maintained. These techniques may support encrypted communications between enterprise networks so as to reduce dependencies upon firewalls. According to particular embodiments, the ability to utilize fallback connections between enterprise networks provides redundancy. Conferencing features supported by a central brokerage device may increase the desirability of packet-based telephony solutions.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
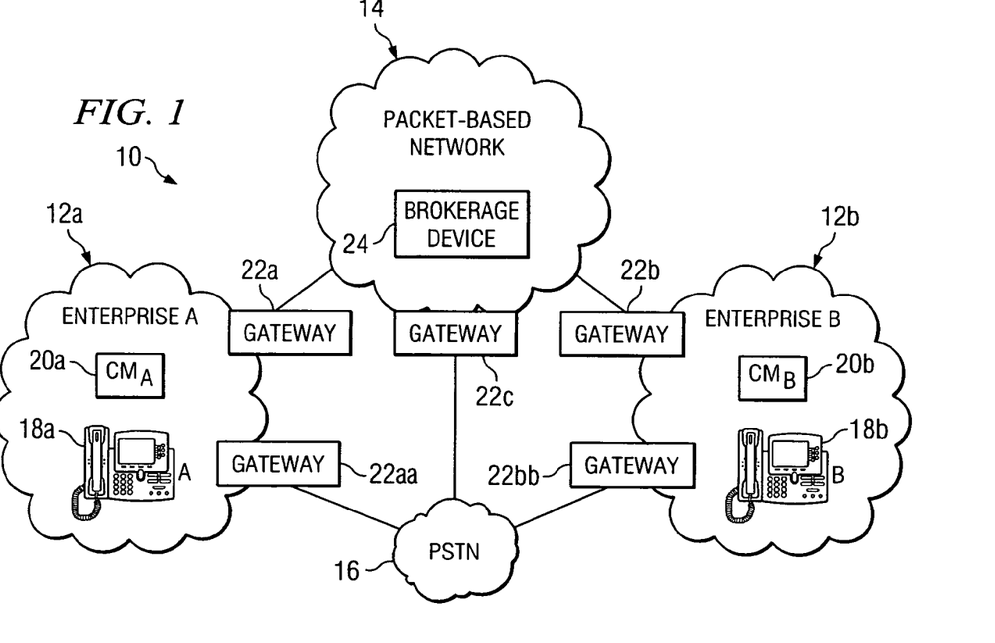
FIG. 1 illustrates a communication system including a central brokerage device that supports inter-enterprise communications.

FIG. 1 illustrates a communication system, indicated generally at 10, that includes multiple enterprise networks 12 interconnected by a packet-based network 14 and a public switched telephone network (PSTN) 16. In the embodiment illustrated, enterprise networks 12 include telephony devices 18 and call management devices 20. Furthermore, enterprise networks 12 as well as packet-based network 14 include gateways 22. As illustrated, packet-based network 14 also includes brokerage device 24. In general, communications sessions may be established between enterprise networks 12 through packet-based network 14 and/or PSTN 16. More particularly, brokerage device 24 may store connectivity data associated with enterprise networks 12, identify particular connectivity data using a telephone number communicated to brokerage device 24, and provide the particular connectivity data to the appropriate element of system 10 so that secure communications session may be established between enterprise networks 12.

Enterprise networks 12 each represent any suitable collection of hardware and controlling logic to support packet-based communications between devices. Each enterprise network 12 provides an infrastructure to interconnect devices within an enterprise as well as with other elements of system 10. In a particular embodiment, each enterprise network 12 may include one or multiple networks, such as packet-based local area networks (LANs), wide area networks (WANs), and/or any other appropriate form of network.

Packet-based network 14 represents any suitable collection of hardware and controlling logic to support packet-based communications between devices. Similar to enterprise networks 12, packet-based network 14 provides an infrastructure to interconnect devices within system 10. In a particular embodiment, packet-based network 14 may include one or multiple networks, such as packet-based LANs, WANs, and/or any other appropriate form of network. Furthermore, packet-based network 14 may include all or portions of various public and private networks such as the Internet.

PSTN 16 represents communications equipment, including hardware and any appropriate controlling logic, through which enterprise networks 12 may communicate. PSTN 16 may include switches, wireline and wireless communication devices, and any other appropriate equipment for interconnecting enterprise networks 12. PSTN 16 may include portions of public and private networks providing network transport services between various geographic areas and networks.

Telephony devices 18 each represent packet-based communications equipment, including hardware and any appropriate controlling logic, for providing telephony services over packet-based networks including enterprise networks 12 and packet-based network 14. Telephony devices 18 may communicate using Internet Protocol (IP). For example, telephony devices 12 may include Voice over IP (VoIP) telephones, such as telephones supporting H.323 and/or session initiation protocol (SIP). However, telephony devices 12 include any appropriate communication devices using any suitable protocols. Note that in the embodiment illustrated one telephony device 18a is located in enterprise 12a and one telephony device 18b is located in enterprise network 12b. However, any number of telephony devices 18 may be located inside and outside any enterprise network 12, such as within packet-based network 14.

Call management devices 20 each represent equipment, including hardware and any appropriate controlling logic, for managing communications sessions involving telephony devices 18. Furthermore, call management devices 20 may interact with gateways 22 to provide for secure communications within system 10. Note that in the embodiment illustrated one call management device 20a is located in enterprise 12a and one call management device 20b is located in enterprise network 12b. For example, call management device 20a may manage communications sessions involving telephony device 18a, while call management device 20b may manage communications sessions involving telephony device 18b. However, any number of call management devices 20 may be located inside and outside any enterprise network 12, such as within packet-based network 14. Furthermore, while illustrated as a separate component of system 10, the functions of call managers 20 may be incorporated within or distributed among any suitable element or elements. Thus, for example, the functions of call managers 20 may be provided within selected and/or each telephony device 18.

Gateways 22 each represent communications equipment, including hardware and any appropriate controlling logic, for interconnecting various types of networks. Gateways 22 may be used, for example, to convert communications between different communication protocols. Gateways 22 may also be used to provide for secure communications between networks. For example, gateways 22 may support virtual private network (VPN) technology. Furthermore, gateways 22 may store and communicate encryption keys for encrypting and decrypting communications within system 10.

Note that while enterprise networks 12a and 12b, as illustrated, only include one telephony device 18 and one call management device 20, particular embodiments may include multiple telephony devices 18 and call management devices 20 in particular enterprise networks 12. Furthermore, while each enterprise network 12 includes only one gateway 22 coupled to packet-based network 14 and only one gateway 22 coupled to PSTN 16, multiple gateways 22 may be used to couple to packet-based network 14 and multiple gateways 22 may be used to couple to PSTN 16.

Brokerage device 24 represents any suitable collection of hardware and controlling logic operable to support inter-enterprise communications. Thus, for example, brokerage device 24 may include a softswitch, domain name system (DNS) server, or any other appropriate device for providing number to address and/or address to address resolution. Furthermore, according to particular embodiments, brokerage device 24 may also provide conferencing features.

In operation, brokerage device 24 may be used as a central repository for storing connectivity data used to establish inter-enterprise communications sessions. As used herein, connectivity data may include any of various types of information used to establish inter-enterprise communications sessions. For example, connectivity data may include IP addresses of particular gateways 22 associated with destination enterprise networks 12, port numbers associated with the particular gateways 22, and/or encryption algorithms or identifications of encryption algorithms utilized by particular gateways 22. Note that brokerage device 24 may be subject to a service agreement that permits brokerage device 24 to access connectivity data for a particular enterprise. Thus, according to a particular embodiment, a first enterprise network 12 may access and use the connectivity data to couple to and establish a secure communications session with a particular telephony device 18 located in a second enterprise network 12.

For example, a user of telephony device 18a may dial a telephone number associated with telephony device 18b. Telephony device 18a may communicate the telephone number to call management device 20a, where a dial plan stored within call management device 20a may be used to determine how to route the call and establish a communications session. For example, the dial plan may identify local telephony devices 18 within enterprise network 12a using the telephone number. However, if the telephone number is not associated with any telephony device 18 located within enterprise 12a, call management device 20a may seek assistance in determining how to route the call. For example, if call management device 20a determines that the telephone number is not associated with a local telephony device 18, call management device 20a may communicate the telephone number to brokerage device 24 for assistance in routing the call.

Brokerage device 24 may receive the telephone number communicated from call management device 20a through gateway 22a. After receiving the telephone number, brokerage device 24 may analyze the telephone number to determine whether the telephone number matches or is otherwise associated with resolution data stored by brokerage device 24. Resolution data may associate telephone numbers and/or particular combinations of digits in telephone numbers with particular enterprise networks 12 and/or particular connectivity data. Thus, brokerage device 24 may provide number to address resolution. For example, if the telephone number communicated by call management device 20a is associated with telephony device 18b, brokerage device 24 may be able to identify enterprise network 12b and/or appropriate connectivity data using the resolution data. Alternatively or in addition, brokerage device 24 may provide address to address resolution. For example, a particular SIP user identification may be associated with a particular network address. Note that brokerage device 24 may be subject to a service agreement that permits brokerage device 24 to access resolution data for a particular enterprise.

According to particular embodiments, brokerage device 24 may include resolution data related to enterprise network 12b if enterprise network 12b has registered telephone numbers and connectivity data with brokerage device 24. However, resolution and connectivity data may be obtained in any of various other ways. For example, a user may input resolution and connectivity data during configuration of brokerage device 24.

If brokerage device 24 fails to identify enterprise network 12b and/or connectivity information associated with enterprise network 12b using the telephone number, brokerage device 24 may communicate a failure message to enterprise network 12a. For example, brokerage device 24 may communicate that no match was found using the telephone number. Elements of enterprise network 12a may couple to enterprise network 12b in response to receiving the message. For example, call management device 20a may receive the failure message and take appropriate action. According to particular embodiments, call management device 20a may route the telephone call through gateway 22aa and PSTN 16. Alternatively or in addition, brokerage device 24 may provide a fallback connection using the telephone number. For example, if brokerage device 24 cannot match the telephone number, brokerage device 24 may create a link to enterprise network 12b through gateway 22c and PSTN 16. Thus, PSTN 16 may be used in various ways to identify and couple to enterprise network 12b.

If brokerage device 24 succeeds in identifying enterprise network 12b and/or connectivity information associated with enterprise network 12b using the telephone number, brokerage device 24 may communicate a success message to enterprise network 12a. The success message may include connectivity data for use by an appropriate element of enterprise network 12a in establishing a communications session with enterprise network 12b through packet-based network 14. According to particular embodiments, brokerage device 24 communicates the connectivity data to gateway 22a.

Gateway 22a may use the connectivity data to establish a communications session with enterprise network 12b. For example, gateway 22a may communicate media to gateway 22b, which may be identified using an IP address identified in the connectivity data. Furthermore, gateway 22a may communicate media to a particular port of gateway 22b identified using the connectivity data. In addition, gateway 22a may use an encryption algorithm provided or identified by the connectivity data. Alternatively or in addition, gateways 22a and 22b may exchange encryption keys to establish an encrypted communications session. According to particular embodiments, media may be streamed directly between gateway 22a and gateway 22b. However, in alternative embodiments, brokerage device 24 may insert itself into the media stream. For example, if enterprise network 12b does not support security measures required or desired by enterprise network 12a but brokerage device 24 does, brokerage device 24 may insert itself into the media stream. Thus, for example, an encrypted link between gateway 22a and brokerage device 24 and an unencrypted link between brokerage device 24 and enterprise network 12b may be utilized to transmit communications between enterprise networks 12.

Brokerage device 24 may also support various enhanced features. According to particular embodiments, brokerage device 24 may assist enterprise network 12a in utilizing multiple gateways 22 in association with VoIP calls. For example, a bank of gateways 22a may be available for use in enterprise network 12a, and brokerage device 24 may use a round robin scheduler or other appropriate method to identify a particular one of the gateways 22a for use in association with a particular communications session. In addition, a bank of gateways 22b may be available for use in enterprise network 12b, and brokerage device 24 may similarly use a round robin scheduler or other appropriate method to identify a particular one of the gateways 22b for use in association with a particular communications session. According to particular embodiments, brokerage device 24 may communicate to call management device 20a connectivity information associated with selected ones of gateways 22 that will be utilized in association with a particular communications session. Call management device 20a may select one of multiple gateways 22a for coupling through packet-based network 14 to gateway 22b. According to alternative embodiments, brokerage device 24 may communicate connectivity data directly to the selected gateways 22. For example, according to particular embodiments, gateway 22a may directly receive connectivity data used to couple to gateway 22b.

Furthermore, brokerage device 24 may support the communication of various types of data between enterprise networks. For example, any one or a combination of voice, video, text, and other rich media streams may be supported by brokerage device 24. One way that brokerage device 24 may support rich media streams is by providing port numbers for use with rich media streams. Alternatively or in addition, brokerage device 24 may provide conferencing services. For example, brokerage device 24 may host a conference call and internally bridge voice and/or other media.

Thus, brokerage device 24 may be utilized to assist in establishing communications between enterprise networks 12. Brokerage device 24 may serve as a central repository for number to address and/or address to address resolution and the provision of connectivity data for establishing communications sessions between enterprise networks 12. Furthermore, brokerage device 24 may select gateways 22, support rich media streams, assist in utilizing enhanced security techniques, and provide conferencing services for use in system 10.

Figure 2:
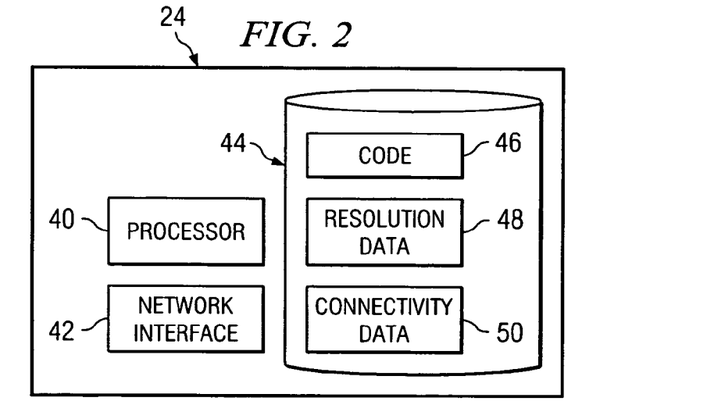
FIG. 2 is a block diagram illustrating functional components of a brokerage device.

FIG. 2 is a block diagram illustrating functional components of brokerage device 24. In the embodiment illustrated, brokerage device 24 includes a processor 40, a network interface 42, and a memory 44. These functional components can operate to support inter-enterprise communications.

Processor 40 controls the operation and administration of elements within brokerage device 24. For example, processor 40 operates to process information received from network interface 42 and memory 44. Processor 40 includes any hardware and/or logic elements operable to control and process information. For example, processor 40 may be a programmable logic device, a controller, and/or any other suitable processing device.

Network interface 42 communicates information to and receives information from devices coupled to brokerage device 24. For example, network interface 42 may communicate with gateways 22a, 22b, and 22c as well as call management devices 20a and 20b. Furthermore, network interface 42 may receive information from and transmit information to telephony devices 18. Thus, network interface 42 includes any suitable hardware and controlling logic used to communicate information to or from elements coupled to brokerage device 24.

Memory 44 stores, either permanently or temporarily, data and other information for processing by processor 40 and communication using network interface 42. Memory 44 includes any one or a combination of volatile or non-volatile local or remote devices suitable for storing information. For example, memory 44 may include random access memory (RAM), read only memory (ROM), magnetic storage devices, optical storage devices, or any other suitable information storage device or a combination of these devices. As illustrated, memory 44 may include one or more memory modules, such as code 46, resolution data 48, and connectivity data 50.

Code 46 includes software, executable files, and/or appropriate logic modules capable when executed to control the operation of brokerage device 24. For example, code 46 may include executable files capable of supporting inter-enterprise communications. Furthermore, code 46 may include instructions to enable brokerage device 24 to provide enhanced security features, fallback communication links, conferencing services, and support for rich communication streams.

Resolution data 48 includes information used by brokerage device 24 to identify a particular enterprise network 12 and/or connectivity data 50 associated with a received telephone number. For example, resolution data 48 may organize particular enterprise networks 12 by telephone numbers. According to particular embodiments, particular sets of digits in telephone numbers may be associated with particular enterprise networks 12 and/or connectivity data 50.

Connectivity data 50 includes information for establishing a communications session with particular enterprise networks 12. The information may be associated with enterprise networks 12 willing to establish communications sessions using the connectivity data 50. As described above, connectivity data 50 may include IP addresses, port numbers, identifiers of encryption algorithms, and other appropriate information.

In operation, network interface 42 may receive a telephone number communicated from enterprise network 12a through gateway 22a. For example, assume that the telephone number is associated with telephony device 18b in enterprise network 12b. In response to receiving the telephone number, processor 40 may execute code 46 to determine whether brokerage device 24 can identify enterprise network 12b as being associated with the telephone number. For example, processor 40 may compare the telephone number with resolution data 48.

Resolution data 48 may include telephone numbers associated with particular enterprise network 12, such as enterprise network 12b. According to particular embodiments, resolution data 48 may identify particular digits and telephone numbers that are associated with particular enterprise networks 12. For example, an area code and first three digits of a telephone number may be associated with a particular enterprise network 12. Thus, processor 40 may utilize resolution data 48 to determine a match for a received telephone number.

If the telephone number is matched with enterprise network 12b using resolution data 48, processor 40 may select appropriate connectivity data 50 associated with enterprise network 12b. Here, connectivity data 50 may include IP addresses, port numbers, algorithms, and other appropriate connectivity data related to enterprise network 12b. The selected connectivity data 50 may be communicated to enterprise network 12a. For example, connectivity data 50 associated with enterprise network 12b may be communicated to gateway 22a, call management device 20a, or any other appropriate element associated with enterprise network 12a.

According to particular embodiments, the information stored in connectivity data 50 may include multiple sets of data for one or more particular enterprise networks 12. For example, when enterprise network 12b includes multiple gateways 22b, separate connectivity data may be stored for each gateway 22b. Furthermore, processor 40 may utilize a scheduler in association with connectivity data 50. For example, processor 40 may select connectivity data associated with one of various gateways 22b associated with enterprise network 12b according to a round robin scheduler. Similarly, processor 40 may utilize a scheduler and communicate the selected connectivity data to one of multiple gateways 22a in enterprise network 12a. In these ways, brokerage device 24 may distribute communications sessions across multiple gateways 22 to reduce load on any one particular gateway 22.

Processor 40 may assist in establishing media streams between gateways 22a and 22b through packet-based network 14. Note that various types of media may be communicated between enterprise network 12a and enterprise network 12b. For example, one or more of various media types may be communicated, such as voice, video, and data. Media streams may or may not pass through brokerage device 24 using network interface 42. However, according to particular embodiments, brokerage device 24 may host conference calls. For example, telephony device 18a may couple to brokerage device 24 through gateway 20a using network interface 42, while telephony device 18b may couple to brokerage device 24 through gateway 20b using network interface 42.

According to particular embodiments, processor 40 communicates connectivity data 50 through network interface 42 to gateway 22a to assist in the establishment an encrypted link between gateways 22a and 22b within packet-based network 14. If encrypted links exist between telephony device 18a and gateway 22a within enterprise network 12a and between gateway 22b and telephony device 18b within enterprise network 12b, messages communicated through network interface 42 may travel through an end-to-end, encrypted link.

Brokerage device 24 may assist in providing other enhanced security measures. For example, if encryption or other protocols utilized by enterprise network 12a and enterprise network 12b are not compatible, processor 40 may communicate connectivity data 50 to gateway 22a that places brokerage device 24 in the media stream. By placing brokerage device 24 in the media steam, processor 40 may receive and translate data communicated to network interface 42 from gateways 22, call management devices 20, and/or telephony devices 18 utilizing different encryption algorithms. Furthermore, simple endpoints not utilizing any encryption algorithms may be supported by creating an encrypted link between enterprise network 12a and brokerage device 24 and a second link between brokerage device 24 and enterprise network 12b. According to particular embodiments, the second link may travel through PSTN 16, for example, through gateway 22c.

If processor 40 is unable to match the telephone number with enterprise network 12b and/or connectivity data 50 using resolution data 48, processor 40 may communicate an appropriate message through network interface 42 to an element of enterprise network 12a. The message may indicate that no match was found with the telephone number. According to particular embodiments, after receiving the message, enterprise network 12a may couple to PSTN 16 through gateway 22aa to route the telephone call through PSTN 16.

According to alternative embodiments, if processor 40 is unable to match the telephone number with enterprise network 12b using resolution data 48, brokerage device 24 may provide a fallback connection to PSTN 16 through gateway 22c. Instead of simply communicating a failure message to enterprise network 12a, processor 40 may couple to enterprise network 12b through gateway 22c and PSTN 16 using network interface 42 to establish the communications session between enterprise networks 12a and 12b.

While this example includes specific functional components for brokerage device 24, brokerage device 24 may include any collection and arrangement of components, including some or all of the enumerated functional components, for supporting communications between enterprise networks 12. Moreover, brokerage device 24 contemplates implementing each of the functional components using any suitable combination and arrangement of hardware and/or logic, and implementing any of the functionalities using a computer program stored on a computer readable medium.

Furthermore, brokerage device 24 may be implemented as a stand-alone device, or aspects of brokerage device 24 may be distributed among various devices within packet-based network 14.

Figure 3:
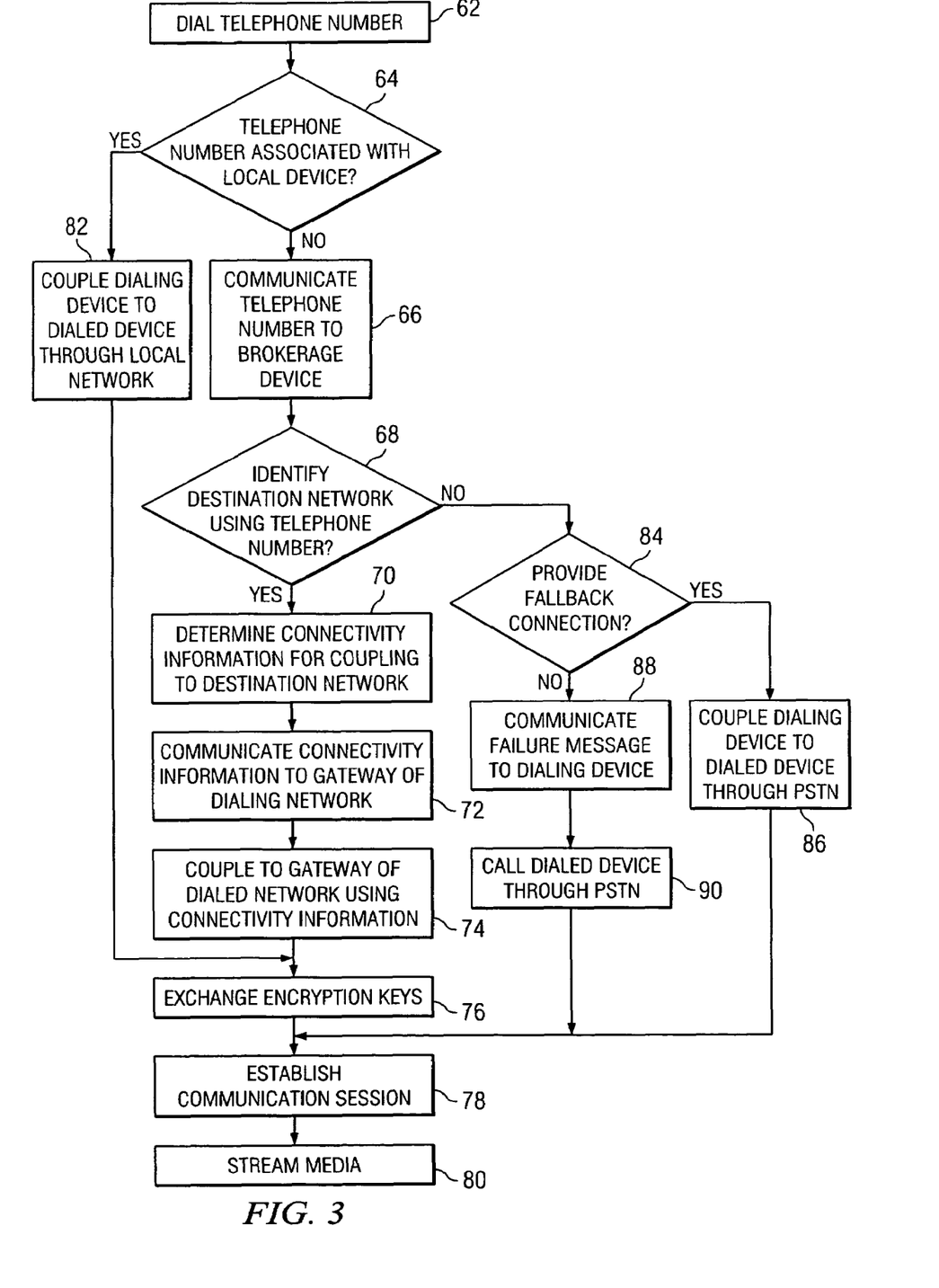
FIG. 3 is a flowchart illustrating a method for establishing an inter-enterprise communications session.

FIG. 3 is a flowchart illustrating a method 60 for inter-enterprise communications using brokerage device 24. A user of telephony device 18a dials a telephone number at step 62, and telephony device 18a may communicate the telephone number to call management device 20a. At step 64, call management device 20a determines whether the telephone number is associated with a local device. For example, call management device 20a may include connectivity data for local devices in enterprise network 12a. Call management device 20a may determine whether the telephone number is associated with some telephony device 18 or another call management device 20 located within enterprise network 12a. If the telephone number communicated by telephony device 18a is not associated with a local device, call management device 20a communicates the telephone number to brokerage device 24 through gateway 22a at step 66.

Brokerage device 24 determines whether a destination network can be identified using the telephone number at step 68. For example, if the telephone number is associated with telephony device 18b, brokerage device 24 determines whether it can identify enterprise network 12b using the telephone number. If brokerage device 24 is able to identify the destination network, brokerage device 24 determines connectivity data for coupling to the destination network at step 70. For example, if brokerage device 24 determines that enterprise network 12b is associated with the telephone number, brokerage device 24 may identify connectivity data 50 associated with gateway 22b. Brokerage device 24 communicates the identified connectivity data 50 to gateway 22a of enterprise network 12a at step 72.

Gateway 22a couples to gateway 22b of enterprise network 12b through packet-based network 14 using the identified connectivity data 50 at step 74. At step 76, gateway 22a and gateway 22b exchange encryption keys. After exchanging encryption keys, a communications session is established at step 78. The established communications session utilizes packet-based network 14 while maintaining security using encryption techniques. Thus, media is streamed between telephony device 18a and telephony device 18b at step 80. According to particular embodiments, the streamed media may include rich media such as video.

Returning to step 64, if the telephone number communicated by telephony device 18a is associated with a local device, call management device 20a couples telephony device 18a to the appropriate telephony device 18 or call management device 20 within enterprise network 12a at step 82. After telephony device 18a is coupled to the destination device, the two devices may exchange encryption keys at step 76, establish a communications session at step 78, and stream media at step 80.

Returning to step 68, if brokerage device 24 is not able to identify the destination network, brokerage device 24 determines whether to provide a fallback connection at step 84. If brokerage device 24 determines to provide a fallback connection, brokerage device 24 couples telephony device 18a to the dialed device through PSTN 16 using gateway 22c at step 86. After coupling telephony device 18a to the dialed device through PSTN 16, the communications session may be established at step 78 and media may be streamed between telephony device 18a and the dialed device at step 80. On the other hand, if brokerage device 24 determines not to provide a fallback connection at step 84, brokerage device 24 may communicate a failure message to telephony device 18a at step 88. After receiving the failure message, telephony device 18a may call the dialed device using the telephone number through PSTN 16 at step 90. After calling the dialed device, a communications session may be established to step 78 and media may be streamed between telephony device 18a and the dialed device at step 80.

Thus, method 60 represents one embodiment of a method for inter-enterprise communications using brokerage device 24. In particular, method 60 illustrates actions that may be taken by elements of system 10 to route a telephone call through an appropriate network. Secure calls may be routed through packet-based network 14 using connectivity data provided by brokerage device 24. When brokerage device 24 is unable to resolve a telephone number to identify appropriate connectivity data, the telephone call may be routed through PSTN 16 as a fallback technique.

Method 60 may be modified in various ways. For example, multiple gateways 22 may be used in enterprise network 12a and/or enterprise network 12b. Thus, brokerage device 24 may utilize a scheduler to identify connectivity data 50 appropriate for particular gateways 22 when appropriate. Furthermore, according to particular embodiments brokerage device 24 may insert itself into the media stream to provide protocol translation and/or conferencing services.

Thus, the preceding flowchart illustrates a particular method for inter-enterprise communications utilizing a central brokerage device 24. However, this flowchart illustrates only one exemplary method of operation, and communication system 10 contemplates devices using any suitable techniques, elements, and applications for performing similar methods. Thus, many of the steps in the flowchart may take place simultaneously and/or in different orders than as shown. In addition, the devices may use methods with additional steps or fewer steps, so long as the methods remain appropriate.

Although the present invention has been described in several embodiments, a myriad of changes and modifications may be suggested to one skilled in the art, and it is intended that the present invention encompass such changes and modifications as fall within the present appended claims.

What is claimed is:

1. A method for inter-enterprise telephony communications, comprising:
   receiving, for a plurality of enterprise networks, resolution information specifying a plurality of telephone identifiers associated with each of the enterprise networks and connectivity information specifying a network address associated with each of the enterprise networks;
   storing the resolution information and the connectivity information for each of the enterprise networks in a central brokerage device;
   receiving a packet encoding a dialed telephone identifier generated by a first telephony device located in a first enterprise network, wherein the dialed telephone identifier is associated with a second telephony device located in a second enterprise network;
   determining whether the dialed telephone identifier matches the resolution information stored in the central brokerage device;
   if the dialed telephone identifier matches the resolution information stored in the central brokerage device:
      identifying a network address of the second enterprise network using the connectivity information; and
      establishing an encrypted communication link between the first enterprise network and the second enterprise network through a packet-based network using the identified network address; and
   if the dialed telephone identifier does not match the resolution information stored in the central brokerage device:

communicating a message to the first enterprise network that the dialed telephone identifier does not match the resolution information stored in the central brokerage device; and establishing a second communication link between the first enterprise network and the second enterprise network through a circuit-switched network using the dialed telephone identifier.

2. The method of claim 1, further comprising:
if the dialed telephone identifier matches the resolution information stored in the central brokerage device:
generating a second packet encoding the identified network address;
communicating the second packet to a gateway associated with the first enterprise network; and
establishing the encrypted communication link between the gateway and the second enterprise network using the identified network address.

3. The method of claim 1, further comprising:
if the dialed telephone identifier does not match the resolution information stored in the central brokerage device:
establishing a second encrypted communication link between the first enterprise network and the central brokerage device through the packet-based network; and
establishing a third communication link between the central brokerage device and the second enterprise network through the circuit-switched network using the dialed telephone identifier.

4. The method of claim 1, further comprising:
if the dialed telephone identifier matches the resolution information stored in the central brokerage device:
exchanging encryption information between the first enterprise network and the second enterprise network using the connectivity information; and
encrypting and decrypting communications transmitted between the first enterprise network and the second enterprise network using the encryption information.

5. The method of claim 1, wherein the connectivity information associated with the second enterprise network identifies an Internet Protocol (IP) address and a port of a gateway associated with the second enterprise network.

6. The method of claim 5, wherein the gateway is a selected one of a plurality of gateways associated with the second enterprise network.

7. The method of claim 1, further comprising:
communicating rich media to the second telephony device using the encrypted communication link.

8. A system for inter-enterprise telephony communications, comprising:
a central brokerage device operable to receive, for each of a plurality of enterprise networks, resolution information specifying a plurality of telephone identifiers associated with each of the enterprise networks and connectivity information specifying a network address associated with each of the enterprise networks, to store the resolution information and the connectivity information for each of the enterprise networks, to receive a packet encoding a dialed telephone identifier generated by a first telephony device located in a first enterprise network, wherein the dialed telephone identifier is associated with a second telephony device located in a second enterprise network, to determine whether the dialed telephone identifier matches the resolution information stored in the central brokerage device, to identify a network address of the second enterprise network using the connectivity information if the dialed telephone identifier matches the resolution information stored in the central brokerage device, and to communicate a message to the first enterprise network that the dialed telephone identifier does not match the resolution information stored in the central brokerage device if the dialed telephone identifier does not match the resolution information stored in the central brokerage device; and the first enterprise network operable to establish an encrypted communication link with the second enterprise network through a packet-based network using the identified network address if the dialed telephone identifier matches the resolution information stored in the central brokerage device, and to establish a second communication link between the first enterprise network and the second enterprise network through a circuit-switched network using the dialed telephone identifier if the dialed telephone identifier does not match the resolution information stored in the central brokerage device.

9. The system of claim 8, wherein if the dialed telephone identifier matches the resolution information stored in the central brokerage device the central brokerage device is further operable to generate a second packet encoding the identified network address and to communicate the second packet to a gateway associated with the first enterprise network, the gateway operable to establish the encrypted communication link with the second enterprise network using the identified network address.

10. The system of claim 8, wherein if the dialed telephone identifier does not match the resolution information stored in the central brokerage device the central brokerage device is further operable to establish a second encrypted communication link between the first enterprise network and the central brokerage device through the packet-based network and to establish a third communication link between the central brokerage device and the second enterprise network through the circuit-switched network using the dialed telephone identifier.

11. The system of claim 8, wherein if the dialed telephone identifier matches the resolution information stored in the central brokerage device the first enterprise network is further operable to exchange encryption information with the second enterprise network using the connectivity information and to encrypt and decrypt communications transmitted between the first enterprise network and the second enterprise network using the encryption information.

12. The system of claim 8, wherein the connectivity information associated with the second enterprise network identifies an Internet Protocol (IP) address and a port of a gateway associated with the second enterprise network.

13. The system of claim 12, wherein the gateway is a selected one of a plurality of gateways associated with the second enterprise network.

14. The system of claim 8, wherein the first enterprise network is further operable to communicate rich media to the second telephony device using the encrypted communication link.

15. An apparatus supporting inter-enterprise telephony communications, comprising:
a memory operable to receive, for each of a plurality of enterprise networks, resolution information specifying a plurality of telephone identifiers associated with each of the enterprise networks and connectivity information specifying a network address associated with each of the enterprise networks, to store the resolution information and the connectivity information for each of the enterprise networks, and to receive a packet encoding a dialed telephone identifier generated by a first telephony device located in a first enterprise network, wherein the dialed telephone identifier is associated with a second telephony device located in a second enterprise network; and a processor coupled to the memory and operable to determine whether the dialed telephone identifier matches the resolution information stored in the memory, to identify a network address of the second enterprise network using the connectivity information if the dialed telephone identifier matches the resolution information stored in the memory, and to communicate a message to the first enterprise network that the dialed telephone identifier does not match the resolution information stored in the memory if the dialed telephone identifier does not match the resolution information stored in the memory;

wherein the first enterprise network is operable to establish an encrypted communication link with the second enterprise network through a packet-based network using the identified network address if the dialed telephone identifier matches the resolution information stored in the memory, and to establish a second communication link between the first enterprise network and the second enterprise network through a circuit-switched network using the dialed telephone identifier if the dialed telephone identifier does not match the resolution information stored in the memory.

16. The apparatus of claim 15, wherein if the dialed telephone identifier matches the resolution information stored in the memory the processor is further operable to generate a second packet encoding the identified network address and to communicate the second packet to a gateway associated with the first enterprise network, the gateway operable to establish the encrypted communication link with the second enterprise network using the identified network address.

17. The apparatus of claim 15, wherein if the dialed telephone identifier does not match the resolution information stored in the memory the processor is further operable to establish a second encrypted communication link between the first enterprise network and the central brokerage device through the packet-based network and to establish a third communication link between the central brokerage device and the second enterprise network through the circuit-switched network using the dialed telephone identifier.

18. The apparatus of claim 15, wherein if the dialed telephone identifier matches the resolution information stored in the memory the first enterprise network is further operable to exchange encryption information with the second enterprise network using the connectivity information and to encrypt and decrypt communications transmitted between the first enterprise network and the second enterprise network using the encryption information.

19. The apparatus of claim 15, wherein the connectivity information associated with the second enterprise network identifies an Internet Protocol (IP) address and a port of a gateway associated with the second enterprise network.

20. The apparatus of claim 19, wherein the gateway is a selected one of a plurality of gateways associated with the second enterprise network.

21. The apparatus of claim 15, wherein the first enterprise network is further operable to communicate rich media to the second telephony device using the encrypted communication link.

22. A computer readable medium encoded with logic for inter-enterprise telephony communications, the logic operable when executed to:
receive, for each of a plurality of enterprise networks, resolution information specifying a plurality of telephone identifiers associated with each of the enterprise networks and connectivity information specifying a network address associated with each of the enterprise networks;
store the resolution information and the connectivity information for each of the enterprise networks in a central brokerage device;
receive a packet encoding a dialed telephone identifier generated by a first telephony device located in a first enterprise network, wherein the dialed telephone identifier is associated with a second telephony device located in a second enterprise network;
determine whether the dialed telephone identifier matches the resolution information stored in the central brokerage device;
if the dialed telephone identifier matches the resolution information stored in the central brokerage device:
identify a network address of the second enterprise network using the connectivity information; and
establish an encrypted communication link between the first enterprise network and the second enterprise network through a packet-based network using the identified network address; and
if the dialed telephone identifier does not match the resolution information stored in the central brokerage device:
communicate a message to the first enterprise network that the dialed telephone identifier does not match the resolution information stored in the central brokerage device; and
establish a second communication link between the first enterprise network and the second enterprise network through a circuit-switched network using the dialed telephone identifier.

23. The computer readable medium-of claim 22, further operable when executed to:
if the dialed telephone identifier matches the resolution information stored in the central brokerage device:
generate a second packet encoding the identified network address;
communicate the second packet to a gateway associated with the first enterprise network; and
establish the encrypted communication link between the gateway and the second enterprise network using the identified network address.

24. The computer readable medium of claim 22, further operable when executed to:
if the dialed telephone identifier does not match the resolution information stored in the central brokerage device:
establish a second encrypted communication link between the first enterprise network and the central brokerage device through the packet-based network; and
establish a third communication link between the central brokerage device and the second enterprise network through the circuit-switched network using the dialed telephone identifier.

25. The computer readable medium of claim 22, further operable when executed to:
if the dialed telephone identifier matches the resolution information stored in the central brokerage device:

exchange encryption information between the first enterprise network and the second enterprise network using the connectivity information; and encrypt and decrypt communications transmitted between the first enterprise network and the second enterprise network using the encryption information.

26. The computer readable medium of claim 22, wherein the connectivity information associated with the second enterprise network identifies an Internet Protocol (IP) address and a port of a gateway associated with the second enterprise network.

27. The computer readable medium of claim 26, wherein the gateway is a selected one of a plurality of gateways associated with the second enterprise network.

28. The computer readable medium of claim 22, further operable when executed to:

communicate rich media to the second telephony device using the encrypted communication link.

29. A system for inter-enterprise telephony communications, comprising:

means for receiving, for each of a plurality of enterprise networks, resolution information specifying a plurality of telephone identifiers associated with each of the enterprise networks and connectivity information specifying a network address associated with each of the enterprise networks;

means for storing the resolution information and the connectivity information for each of the enterprise networks in a central brokerage device;

means for receiving a packet encoding a dialed telephone identifier generated by a first telephony device located in a first enterprise network, wherein the dialed telephone identifier is associated with a second telephony device located in a second enterprise network;

means for determining whether the dialed telephone identifier matches the resolution information stored in the central brokerage device;

if the dialed telephone identifier matches the resolution information stored in the central brokerage device:

means for identifying a network address of the second enterprise network using the connectivity information; and means for establishing an encrypted communication link between the first enterprise network and the second enterprise network through a packet-based network using the identified network address; and if the dialed telephone identifier does not match the resolution information stored in the central brokerage device:

means for communicating a message to the first enterprise network that the dialed telephone identifier does not match the resolution information stored in the central brokerage device; and means for establishing a second communication link between the first enterprise network and the second enterprise network through a circuit-switched network using the dialed telephone identifier.

30. The system of claim 29, further comprising:

if the dialed telephone identifier matches the resolution information stored in the central brokerage device:

means for generating a second packet encoding the identified network address;

means for communicating the second packet to a gateway associated with the first enterprise network; and means for establishing the encrypted communication link between the gateway and the second enterprise network using the identified network address.

31. The system of claim 29, further comprising:

if the dialed telephone identifier does not match the resolution information stored in the central brokerage device:

means for establishing a second encrypted communication link between the first enterprise network and the central brokerage device through the packet-based network; and means for establishing a third communication link between the central brokerage device and the second enterprise network through the circuit-switched network using the dialed telephone identifier.

32. The system of claim 29, further comprising:

if the dialed telephone identifier matches the resolution information stored in the central brokerage device:

means for exchanging encryption information between the first enterprise network and the second enterprise network using the connectivity information; and means for encrypting and decrypting communications transmitted between the first enterprise network and the second enterprise network using the encryption information.

33. The system of claim 29, wherein the connectivity information associated with the second enterprise network identifies an Internet Protocol (IP) address and a port of a gateway associated with the second enterprise network.

34. The system of claim 33, wherein the gateway is a selected one of a plurality of gateways associated with the second enterprise network.

35. The system of claim 29, further comprising:

means for communicating rich media to the second telephony device using the encrypted communication link.

36. A system for supporting communications between enterprise networks, comprising:

a telephony device operable to couple to a first enterprise network, to receive a telephone identifier associated with a remote device, and to communicate the telephone identifier to a local call management device;

the local call management device operable to couple to the telephony device, to receive the telephone identifier, to determine that the remote device is not coupled to the first enterprise network based on the telephone identifier, and to communicate the telephone identifier to a central brokerage device;

the central brokerage device operable to couple to the local call management device, to receive the telephone identifier, to identify a second enterprise network associated with the remote device using the telephone identifier, to determine connectivity information associated with the second enterprise network, to couple to a gateway associated with the first enterprise network, and to communicate the connectivity information to the gateway; and the gateway operable to couple to the central brokerage device, to receive the connectivity information, to establish a communication link with a second gateway associated with the second enterprise network using the connectivity information, to exchange encryption information with the second gateway, and to encrypt and decrypt communications transmitted between the telephony device and the remote device using the communication link and the encryption information.

* * * * *